(12) United States Patent
Serebrin (10) Patent No.: US 8,307,360 B2
(45) Date of Patent: Nov. 6, 2012

(54) CACHING BINARY TRANSLATIONS FOR VIRTUAL MACHINE GUEST

(75) Inventor: Benjamin C. Serebrin, Sunnyvale, CA (US)

(73) Assignee: Advanced Micro Devices, Inc., Suunyvale, CA (US)

( * ) Notice: Subject to any disclaimer, the term of this patent is extended or adjusted under 35 U.S.C. 154(b) by 1023 days.

(21) Appl. No.: 12/272,954

(22) Filed: Nov. 18, 2008

(65) Prior Publication Data

US 2009/0187902 A1 Jul. 23, 2009

Related U.S. Application Data

(60) Provisional application No. 61/022,700, filed on Jan. 22, 2008.

(51) Int. Cl.
*G06F 9/455* (2006.01)
(52) U.S. Cl. .............................. 718/1; 712/209; 712/227
(58) Field of Classification Search ...... 718/1; 712/209, 712/227
See application file for complete search history.

(56) References Cited

U.S. PATENT DOCUMENTS

| | | | | |
|---|---|---|---|---|
| 4,667,290 A * | 5/1987 | Goss et al. | ..................... | 717/147 |
| 5,452,462 A * | 9/1995 | Matsuura et al. | ................. | 718/1 |
| 5,813,039 A * | 9/1998 | Wakui | ............................ | 711/156 |
| 6,105,124 A * | 8/2000 | Farber et al. | .................... | 712/208 |
| 6,397,242 B1 * | 5/2002 | Devine et al. | ..................... | 718/1 |
| 6,397,379 B1 * | 5/2002 | Yates et al. | ..................... | 717/140 |
| 6,704,925 B1 * | 3/2004 | Bugnion | ........................ | 717/138 |
| 6,763,452 B1 * | 7/2004 | Hohensee et al. | ............ | 712/227 |
| 6,779,107 B1 * | 8/2004 | Yates | ............................. | 712/229 |
| 6,789,181 B1 * | 9/2004 | Yates et al. | ........................ | 712/4 |
| 7,146,607 B2 * | 12/2006 | Nair et al. | ..................... | 717/151 |
| 7,237,051 B2 * | 6/2007 | Bennett et al. | ................ | 710/260 |
| 7,275,246 B1 * | 9/2007 | Yates et al. | .................... | 718/100 |
| 7,278,030 B1 * | 10/2007 | Chen et al. | ..................... | 713/189 |
| 7,421,689 B2 * | 9/2008 | Ross et al. | ..................... | 718/1 |
| 7,516,453 B1 * | 4/2009 | Bugnion | .......................... | 718/1 |
| 7,937,700 B1 * | 5/2011 | Klaiber et al. | .................... | 718/1 |
| 2004/0117532 A1 * | 6/2004 | Bennett et al. | ................ | 710/260 |
| 2008/0216073 A1 * | 9/2008 | Yates et al. | .................... | 718/100 |

OTHER PUBLICATIONS

Keith Adams, "A comparison of software and Hardware Techniques for x86 Virtualization," ACM 2006, pp. 2-13.

Alexander Klaiber, et al., The Technology Behind Crusoe(TM) Processors, "Low-Power x86-Compatible Processors Implemented with Code Morphing(TM) Software," Jan. 2000, Transmeta Corporation, 18 pages.

(Continued)

*Primary Examiner* — Aimee Li
(74) *Attorney, Agent, or Firm* — Lawrence J. Merkel; Meyertons, Hood, Kivlin, Kowert & Goetzel, P.C.

(57) ABSTRACT

In one embodiment, a method comprises in response to an intercept of a first instruction in a guest that is controlled by a virtual machine monitor (VMM), updating first tracking data corresponding to the first instruction in an intercept tracking table; determining, from the first tracking data, that a translation of the first instruction into a first routine is to be performed; and caching the first routine to be executed in response to a subsequent intercept of the first instruction, wherein the first routine is formed from instructions defined in a same instruction set architecture as the first instruction. In some embodiments, a routine for an intercepted instruction that is within a merge window of the first instruction in a guest may be merged into the same routine with the first instruction.

19 Claims, 6 Drawing Sheets

OTHER PUBLICATIONS

Selinda Chiquoine, "Alpha Learns to do Windows, Digital's FX!32 is the Key to Running win32 Software on Alpha/Windows NT," BYTE Magazine, 1998, 4 pages.

Digital, Digital Press Releases, "Awards Stack Up for DIGITAL FX!32 windows Compatibility Software for ALPHA," Jun. 20, 1997, 7 pages.

Digital Semiconductor, Digital FX!32, "White Paper: How Digital FX!32 Works," Sep. 26, 1997, 4 pages.

Tom Thompson, "An Alpha in PC Clothing, Digital Equipment's new x86 Emulator Technology Makes an Alpha System a Fast x86 clone," BYTE Magazine, Feb. 1996, 7 pages.

\* cited by examiner

| Within N Instructions |
| --- |
| Within N Bytes |
| Within Same Cache Block |
| Within Same Basic Block |
| Intervening Instructions are Non-Branch |
| Intervening Instructions are Non-Exception |

CACHING BINARY TRANSLATIONS FOR VIRTUAL MACHINE GUEST

This application claims benefit of priority to U.S. Provisional Patent Application Ser. No. 61/022,700, filed Jan. 22, 2008. The Provisional Patent Application is incorporated herein by reference. To the extent that anything in the Provisional Patent Application contradicts material expressly included herein, the material herein controls.

BACKGROUND

1. Field of the Invention

This invention relates to virtual machines in computer systems and, more particularly, to processing intercepted instructions.

2. Description of the Related Art

Virtualization has been used in computer systems for a variety of different purposes. For example, virtualization can be used to execute privileged software in a "container" to prevent the privileged software from directly accessing and/or making changes to at least some of the physical machine state without first being permitted to do so by a virtual machine manager (VMM) that controls the virtual machine. Such a container can prevent "buggy" or malicious software from causing problems on the physical machine. Additionally, virtualization can be used to permit two or more privileged programs to execute on the same physical machine concurrently. The privileged programs can be prevented from interfering with each other since access to the physical machine is controlled. Privileged programs may include operating systems, and may also include other software which expects to have full control of the hardware on which the software is executing. In another example, virtualization can be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. The virtual machine elements may be implemented by hardware that the VMM allocates to the virtual machine, at least temporarily, and/or may be emulated in software. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

Both the VMM and the guests are executed by the processor(s) included in the physical machine. Accordingly, switching between execution of the VMM and the execution of guests occurs in the processor(s) over time. Particularly, the VMM schedules a guest for execution, and a switch to executing that guest is performed. At various points in time, a switch from executing a guest to executing the VMM also occurs so that the VMM can retain control over the physical machine (e.g. when the guest attempts to access a peripheral device, when a new page of memory is to be allocated to the guest, when it is time for the VMM to schedule another guest, etc.). A switch between a guest and the VMM (in either direction) is often referred to as a "world switch".

Intercepting certain instructions in the guest causes a world switch to the VMM. Instructions are intercepted for a variety of reasons. For example, an instruction that reads privileged processor state can be intercepted to ensure that the VMM will permit the guest to access the state (or to permit the VMM to perform the access on behalf of the guest). In some cases, the VMM changes processor state from the value that the guest established or expects, and instructions which access the state are intercepted to permit the VMM to supply the expected state instead of the changed state. An instruction that writes privileged state or other processor/system state that the VMM desires to control can be intercepted.

In response to each interception, the VMM is invoked to emulate the intercepted event and provide an appropriate response. In some cases, especially for frequently intercepted events, the performance loss for the emulation may be larger than desired.

SUMMARY

In one embodiment, a method comprises, in response to an intercept of a first instruction in a guest that is controlled by a virtual machine monitor (VMM), updating first tracking data corresponding to the first instruction in an intercept tracking table. The method further comprises determining, from the first tracking data, that a translation of the first instruction into a first routine is to be performed. The method still further comprises caching the first routine to be executed in response to a subsequent intercept of the first instruction, wherein the first routine is formed from instructions defined in a same instruction set architecture as the first instruction.

In an embodiment, a computer accessible storage medium stores a plurality of instructions which, when executed in response to an intercept of a first instruction in a guest that is controlled by the plurality of instructions: update first tracking data corresponding to the first instruction in an intercept tracking table; determine, from the first tracking data, that a translation of the first instruction into a first routine is to be performed; and cache the first routine to be executed in response to a subsequent intercept of the first instruction, wherein the first routine is formed from instructions defined in a same instruction set architecture as the first instruction.

In an embodiment, a method comprises, in response to an intercept of a first instruction in a guest that is controlled by a virtual machine monitor (VMM), detecting that the first instruction is within a merge window of a second instruction in the guest. The VMM has cached a first routine corresponding to the second instruction to be executed in response to an intercept of the second instruction. The method further comprises translating the first instruction into a plurality of additional instructions; and adding the plurality of additional instructions to the first routine.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Virtualization Overview

Figure 1:
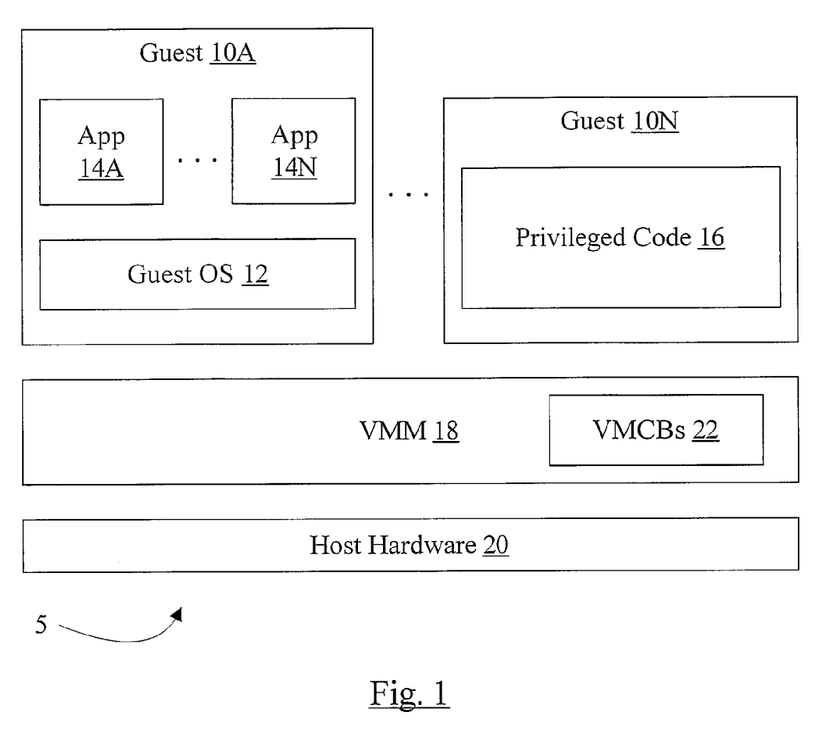
FIG. 1 is a block diagram of one embodiment of a computer system that implements virtualization.

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18. The VMM 18 and the host OS (if included) may together be referred to as the "host", in one embodiment.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables or nested page tables to control access to the host physical address space. The shadow page tables may remap from guest virtual addresses to host physical addresses (effectively the remapping the guest "physical address" assigned by memory management software in the guest 10A-10N to host physical address), while nested page tables may receive the guest physical address as an input and map to the host physical address. Using the shadow page tables or nested page tables for each guest 10A-10N, the VMM 18 may ensure that guests do not access other guests' physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain.

As mentioned previously, the VMM 18 may maintain a VMCB 22 for each guest 10A-10N. The VMCB 22 may generally comprise a data structure stored in a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for exiting the guest). In some embodiments, only a portion of the processor state is loaded via the instruction that transfers control to the guest corresponding to the VMCB 22 (the "Virtual Machine Run (VMRUN)" instruction), and other desired state may be loaded by the VMM 18 prior to executing the VMRUN instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored. Furthermore, in one embodiment, two or more exit mechanisms may be defined. In one embodiment, the amount of state stored and the location of state that is loaded may vary depending on which exit mechanism is selected.

In one embodiment, the VMM 18 may also have an area of memory allocated to store the processor state corresponding to the VMM 18. When the VMRUN is executed, the processor state corresponding to the VMM 18 may be saved in the area. When the guest exits to the VMM 18, the processor state from the area may be reloaded from the area to permit the VMM 18 to continue execution. In one implementation, for example, the processor may implement a register (e.g. a model specific register, or MSR) to store the address of the VMM 18 save area.

Additionally, the VMCB 22 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (or, viewed in another way, whether or not the intercept is enabled). As used herein, an event is "intercepted" in a guest if, should the event occur in the guest, the processor exits the guest for processing of the event. In one embodiment, the intercept configuration may include a second set of indications which indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event. In another embodiment, the first set of intercept indications may indicate which intercept events are to be intercepted and the second set of intercept indications may indicate which exit mechanism to use for each intercept.

Generally, the exit mechanism may define the operations performed by the processor to exit guest execution (generally in a restartable fashion) and to begin executing other code. In one embodiment, one exit mechanism may include saving a small amount of processor state and loading state for a minivisor. The minivisor may execute "near" the guest, and may perform relatively simple intercept processing. Another exit mechanism may exit to the VMM, saving a larger amount of processor state and loading the VMM's processor state. Thus, intercept events may be processed by different instruction code depending on the event. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

In one embodiment, the processor(s) in the host hardware 20 may support an alternate address space when the VMM code (e.g. the VMM 18 and/or the minivisor, in embodiments that implement the minivisor) is being executed. The alternate address space may be the virtual address space of the guest which has most recently exited. Accordingly, if the VMM code needs to access memory that is accessed by the guest, the VMM code need not include instructions to locate the guest's page tables, process the page tables ("walk" the page tables) to identify the translation, walk the nested page tables (where implemented) and read the resulting physical address in memory. Instead, the VMM code may include an instruction that specifies the alternate address space for the access and the translation hardware may automatically translate the address through the page tables indicated by the alternate address space (e.g. the guest's page tables). Performance of the VMM code may be improved.

Caching Binary Translations

Intercepts are implemented to ensure that the VMM remains in control of the virtual machine guest, but they can also reduce performance. Particularly, frequently-occurring intercepts may result in a large performance loss as the VMM analyzes the exit code to determine the reason for the intercept, possibly accesses guest context to determine more information about the intercept, and emulates the operation that was intercepted. For a frequently-occurring intercepted instruction (i.e. the same instruction at the same point in the guest code) that requires the same emulation each time, it may be possible to convert the intercepted instruction into a routine that can be executed in response to the intercept. The effort of analyzing the intercept to determine the emulation that needs to be performed may be averted, and the routine may simply be executed to implement the intercept processing. Generating a routine to process an intercept is referred to herein as "binary translation" or simply "translation", since a routine is effectively substituted for the intercepted instruction.

In this case, the routine is coded using instructions in the same instruction set as the guest (e.g. the x86 instruction set, including the AMD64™ extensions, in one embodiment). However, the routine is executed in the VMM 18 rather than in the guest 10A-10N. The binary translation is purely an attempt to improve execution performance, and is not required as the VMM 18 may use emulation to process any intercept. As used herein, a "routine" comprises a code sequence including a plurality of instructions that are intended to be executed from beginning to end. It is possible to have exceptions during the execution of the routine, in some embodiments, but in the absence of an exception the routine may generally execute to completion. The routine may include branches, looping behavior, etc., similar to other code sequences. The translated routine performs the operations that the intercepted instruction was intended to perform (possibly modified so that the VMM 18 retains control of the guest). By contrast, emulation includes analyzing the intercept exit code, the intercepted instruction, and/or other data to determine what operations are to be performed, and then performing those operations. Viewed in another way, the translated routine may eliminate the analysis portion of emulation, and only perform the desired operations.

In one embodiment, the VMM 18 may allocate storage space (e.g. in the memory system) for a translation cache to store the routines that have been generated for certain intercepted instructions occurring in a given guest. The VMM 18 may generate a routine to process an intercept by tracking the intercepts, and generating routines for the intercepted instructions that are occurring frequently. Alternatively, a combination of the frequency of occurrence of the intercept and the performance cost for emulating the intercepted instruction may be used to select intercepts for which routines are to be generated. However, the translation is an optional feature which need not be performed to ensure correct operation of the guest.

In some embodiments, the VMM 18 may be further configured to detect intercepted instructions that occur within a close proximity of each other. If a routine is generated for the first of the intercepted instructions, then the second intercepted instruction may be handled in the same routine. The second intercept (for the second instruction) may subsequently be avoided. A merge window may be defined in the guest code sequence following an intercepted instruction, and if another intercept is detected within the window, the next intercepted instruction may be merged into the first intercepted instruction's routine. Instructions between the two intercepted instructions may also be included in the routine (if any), and then execution in the guest may return to the point after the second intercepted instruction. The merge window may thus define the maximum distance (according to program order) between the first intercepted instruction and the second intercepted instruction for which merging may be performed. That is, if the distance between the intercepted instructions is greater than the maximum distance, the merge will not be performed even if it could otherwise be performed if the distance was less. Distance may be measured in a variety of fashions (e.g. instructions, bytes, basic blocks, whether or not intervening instructions are branches or can cause exceptions, etc.). Examples are discussed in more detail below.

Figure 2:
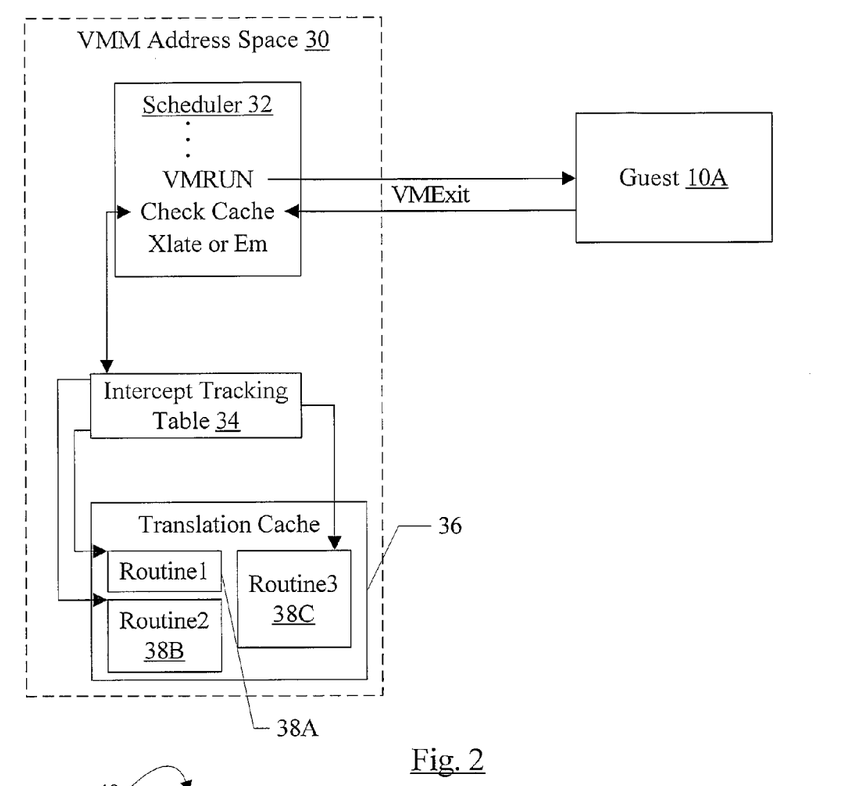
FIG. 2 is a block diagram illustrating one embodiment of a guest and a VMM address space including VMM code, an intercept tracking table, and a translation cache.

Turning now to FIG. 2, a block diagram illustrating a guest 10A and a VMM address space 30 that is accessible to the VMM (and not the guest 10A) and includes the VMM 18 itself as well as various data structures that may be used by the VMM 18. For example, in FIG. 2, a scheduler 32 is shown that may be part of the VMM 18. Also shown in the address space 30 is an intercept tracking table 34 and a translation cache 36. The intercept tracking table 34 and the translation cache 36 may be data structures used by the VMM 18. The VMM address space 30 may be mapped to memory locations in the system memory of the host hardware 20 during operation.

The scheduler 32 may generally be responsible for selecting a guest to execute and invoking the guest. Thus, the scheduler 32 may include various instructions used to select a guest for execution, load any desired processor state that is not automatically loaded using VMRUN, etc. These instructions are represented by the ellipses in the scheduler 32 in FIG. 2. The scheduler 32 may then include the VMRUN instruction, which invokes the guest 10A in this example. Subsequently, an intercept may be detected by the processor while executing the guest 10A, and a VMExit may be performed to the instruction following the VMRUN instruction in the scheduler 32.

The instructions following the VMRUN instruction may first check the translation cache 36 to determine if a routine corresponding to the intercepted instruction is stored in the translation cache 36 ("Check Cache" in FIG. 2). In the illustrated embodiment, the intercept tracking table 34 may track various data for intercepted instructions, and may also include a pointer to a routine in the translation cache 36 for those intercepted instructions that have cached routines. For example, three routines 38A, 38B, and 38C are illustrated in the translation cache 36, with pointers from the intercept tracking table 34 to the beginning of the routines. If a routine is cached, the VMM 18 may execute the cached routine. The cached routine may terminate with an instruction returning to the scheduler 32 (which may return to the guest 10A or schedule another guest).

If no routine is cached for the intercepted instruction, the scheduler may continue with either emulating or translating the intercepted instruction (e.g. depending on the tracking data in the intercept tracking table 34). It is noted that the checking of the translation cache and/or the translation/emulation code may be separate modules in the VMM 18. The instruction following the VMRUN instruction may be a branch to the cache checking code, for example.

Figure 3:
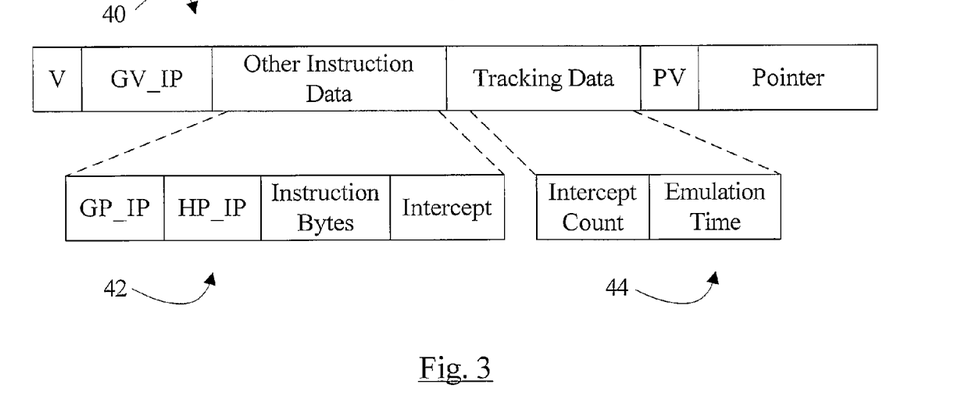
FIG. 3 is a block diagram one embodiment of an entry in the intercept tracking table.

The intercept tracking table 34 comprises a plurality of entries. FIG. 3 is a block diagram illustrating one embodiment of a tracking table entry 40. Other embodiments may include more or less data, and/or may include subsets or supersets of the data and other data, as desired. Each entry 40, when in use, may store tracking data for a corresponding intercepted instruction in a guest. Thus, when an instruction is intercepted in the guest, the cache checking code may check the intercept tracking table 34 for a valid entry corresponding to the intercepted instruction. The entries in the intercept tracking table 34 may identify the corresponding instruction using any desired instruction-related data. Generally, the instruction-related data may be sufficient to uniquely identify the location of the instruction in the guest. Thus, for example, instruction pointer data may be used, where the instruction pointer is the address used to fetch the instruction from memory. In the example of FIG. 3, there is a valid bit (V) indicating whether or not the entry is valid (i.e. tracking intercepts of an instruction). Additionally, a guest virtual instruction pointer (GV_IP) may be stored. The GV_IP may be compared to the IP in the VMCB of the guest to determine if a match on the entry is found. The other instruction data field (shown in exploded form 42 for one embodiment) may be used in conjunction with the GV_IP to ensure that the same instruction is still referenced by the GV_IP. For example, the GV_IP could be the same but, if the translation of the GV_IP has been changed by the guest, a different underlying instruction may be referred to.

The other instruction data may include a guest physical instruction pointer (GP_IP) that results from translating the GV_IP in the guest's page tables. In addition or alternatively, the other instruction data may include a host physical instruction pointer (HP_IP) to which the GV_IP translates through both the guest's page tables and the nested page tables, or through shadow page tables, in various embodiments. The VMM may translate the GV_IP to ensure that the translation still matches to verify that the same instruction is still being referred to. For example, in embodiments in which the alternate address space is implemented, the alternate address space may be used to verify a translation. Instruction bytes from the instruction may be stored and compared to instruction bytes from the currently intercepted instruction. Information identifying the type of intercept may be stored, and may be compared to the current intercept for validation. Any combination of other instruction data may be used in various embodiments. Because multiple guests may be managed by the VMM 18, the other instruction data may also include an identifier of the guest (e.g. an address space identifier (ASID) assigned to the guest).

In addition to the instruction-related data used to verify that the same instruction has been intercepted, the entry 40 may include intercept tracking data (tracking data in FIG. 3, shown in exploded view at reference numeral 44). Generally, the intercept tracking data may track the occurrence of intercepts so that the VMM 18 may make determinations about which intercepted instructions to translate into routines to be executed in response to the intercepted instructions. For example, a count of the number of intercepts (intercept count in FIG. 3) may be maintained. The count may be a count of occurrences since the guest 10A was first invoked, or may be a count that is periodically cleared by the VMM 18. Additionally, the tracking data may include an emulation time, which may indicate how long it takes to emulate the intercepted instruction. The emulation time may be an estimate (e.g. read from a table) based on the type of intercept, or may be measured during execution. Intercepts that require larger amounts of emulation time may be translated even if they occur less frequently than other intercepts, in one embodiment.

In the present embodiment, the entry 40 also includes a pointer valid (PV) bit and a pointer field. The pointer valid bit may indicate whether or not the pointer is valid, and the pointer may be a pointer to the first instruction of the corresponding routine in the translation cache 36. There may be more entries 40 than there are routines in the translation cache 36, so that entries 40 may be used to track intercepts that have not yet qualified for translation (or may not ever qualify). In other embodiments, the translation cache 36 may include a tag storage portion for lookup of routines, and the intercept tracking table 34 may not include the pointer valid and pointer fields, if desired.

The routines 38A-38C may vary in size, according to the operations to be performed for the intercepted instruction. In one embodiment, storage in the translation cache 36 may be allocated in equal-sized blocks, and one or more blocks may be allocated to store a given routine 38A-38C. A free map may be maintained by the VMM 18 to identify which blocks are in use and which blocks are free in the translation cache 36. Other embodiments may store the routines in any desired fashion, and may track which portions of the translation cache are free or in use in any desired fashion.

In embodiments which implement the light weight exit mechanism and the minivisor, the check for cached routines and the translation cache may be handled by the minivisor. In such embodiments, once an intercepted instruction of a given type is cached in the translation cache, the corresponding intercept may be coded as a minivisor intercept. If emulation is needed, a full VMExit to the VMM 18 may be performed. Alternatively, simpler emulations may be handled by the minivisor in addition to the translation cache management and check.

Figure 4:
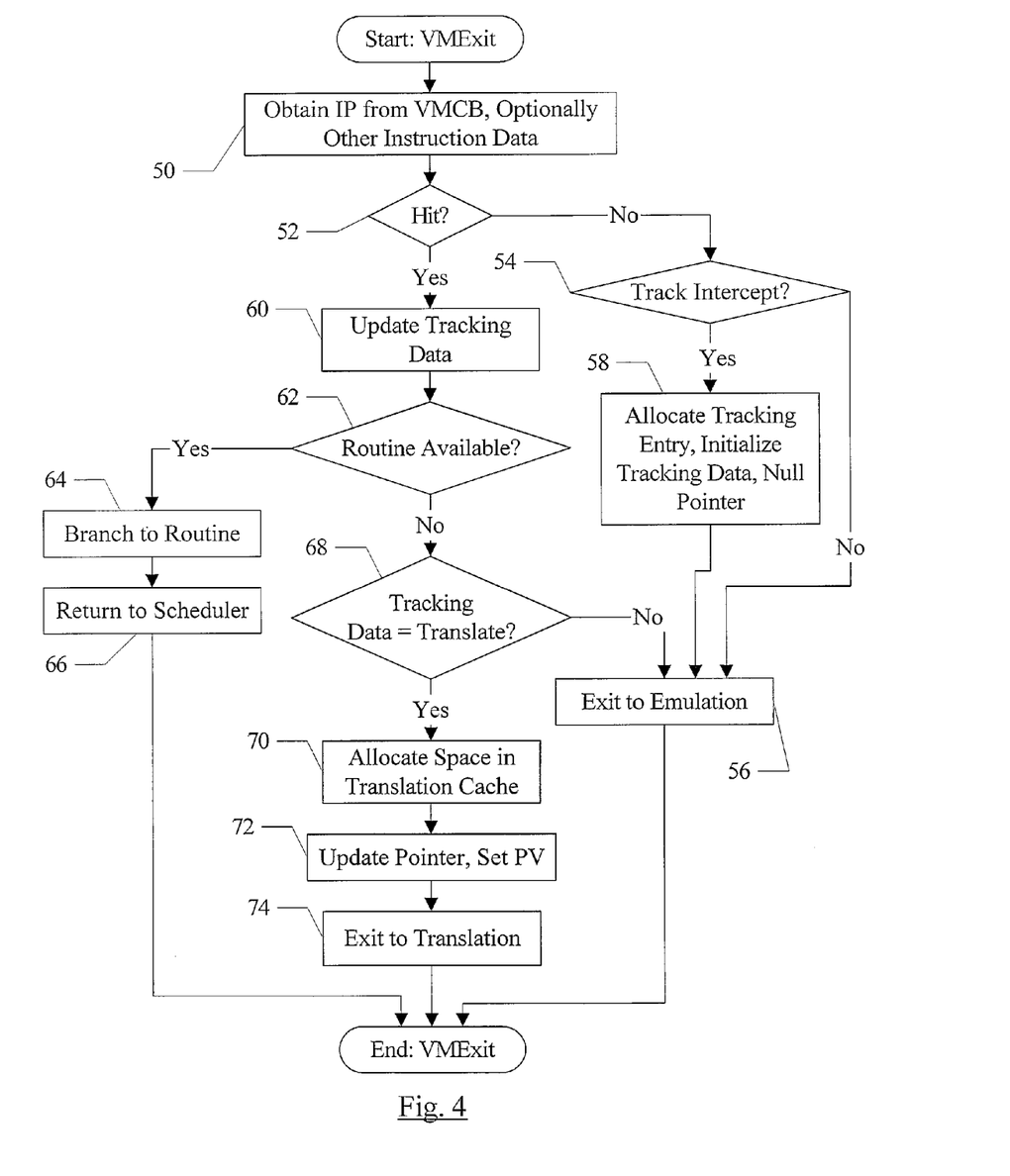
FIG. 4 is a flowchart illustrating operation of one embodiment of the VMM in response to a VMExit

Turning now to FIG. 4, a flowchart is shown illustrating operation of one embodiment of the VMM 18 in response to a VMExit (signalled due to an intercept in a guest 10A-10N). The VMM 18 (and/or the minivisor, in some embodiments) may comprise instructions which, when executed, implement the operation illustrated in FIG. 4. While the blocks are shown in a particular order for ease of understanding, other orders may be used.

The VMM 18 may obtain the instruction pointer (IP) from the VMCB 22 of the guest 10A-10N (block 50). Other instruction data may also optionally be obtained for comparison to the data in the intercept tracking table 34. The data may be obtained from the VMCB 22, processor state in the processor, access to the guest 10A-10N (e.g. through an alternate address space), etc. The VMM 18 may compare the obtained instruction identification data to the intercept tracking table 34. If the intercepted instruction is a miss in the intercept tracking table 34 (decision block 52, "no" leg), then there is no tracking data for the intercepted instruction. The VMM 18 may determine if the intercepted instruction is an intercept that the VMM 18 may translate (decision block 54). In one embodiment, the VMM 18 may translate only certain intercepts. For example, some intercepts may be too variable in their processing for translation (e.g. analysis still needs to be performed), or the translation may be too long to store in the translation cache 36. Long translations may mitigate the advantage of eliminating the analysis portion of the emulation, since the analysis may be small compared to the operations to be performed. In such embodiments, if the intercepted instruction is not one that the VMM 18 supports for translation (decision block 54, "no" leg), the VMM 18 may exit to the analyze and emulate code in the VMM 18 (block 56). If the intercepted instruction is one that the VMM 18 supports (decision block 54, "yes" leg), or if all intercepts are supported (and thus there is no decision block 54), the VMM 18 may allocate an intercept tracking table entry to the intercepted instruction (block 58). The VMM 18 may initialize the tracking data in the entry (e.g. setting the intercept count to zero), and may clear the PV bit so that the pointer field is null. The VMM 18 may exit to the analyze and emulate code (block 52).

In some embodiments, the intercept tracking table 34 may have a maximum size and allocating an intercept tracking table entry may include removing data for a different intercept. Various replacement algorithms may be used (e.g. random, using least recently used type algorithms, etc.). The replacement algorithms may favor retaining entries that have valid pointers and/or retaining entries having higher intercept counts.

If the intercepted instruction is a hit in the intercept tracking table 34 (decision block 52, "yes" leg), the VMM 18 may update the tracking data in the hitting entry (block 60). For example, the intercept count may be incremented. If a routine is available in the translation cache 36 for the hitting entry (e.g. the PV bit is set, and thus the intercepted instruction is a hit in the translation cache 34—decision block 62, "yes" leg), the VMM 18 may branch to the routine indicated by the pointer (block 64) and may return to the scheduler (block 66) after successfully executing the routine.

If a routine is not available (decision block 62, "no" leg), the VMM 18 may determine if the tracking data indicates that the intercepted instruction should be translated (decision block 68). For example, if the intercept count exceeds a desired threshold (greater than one), the VMM 18 may determine that the intercepted instruction should be translated. The threshold may vary based on the emulation time for the intercepted instruction (e.g. higher emulation time may indicate that a lower threshold should be used). If the tracking data does not yet indicate that the intercepted instruction should be translated (decision block 68, "no" leg), the VMM 18 may exit to the analyze and emulate code (block 56).

If the tracking data does indicate that the intercepted instruction should be translated (decision block 68, "yes" leg), the VMM 18 may allocate space in the translation cache 36 for the corresponding routine (block 70), update the pointer field in the corresponding entry of the intercept tracking table 34 and set the PV bit in the entry (block 72), and exit to the translation code (block 74). The translation code may use the pointer as the target to which the translated routine is written.

The allocation of space in the translation cache 36 may involve eliminating another routine from the translation cache 36. Any mechanism for selecting a routine to eliminate may be used, similar to the discussion above with regard to allocating an intercept tracking table entry. Once a routine is eliminated from the translation cache 36, The VMM 18 many null the corresponding pointer in the intercept tracking table 34 (e.g., by clearing the PV bit). The VMM 18 may also clear the tracking data corresponding to the routine that has been eliminated, to begin tracking the corresponding intercept again.

It is noted that the translation code and the analyze and emulate code may be portions of the VMM 18 as well (e.g. code modules that perform the translation or analysis and emulation). The translation code may also perform emulation, so that the current instance of the intercepted instruction is processed, or may execute the corresponding translated routine after generating the routine.

Merging Translations of Multiple Intercepted Instructions

Figure 5:
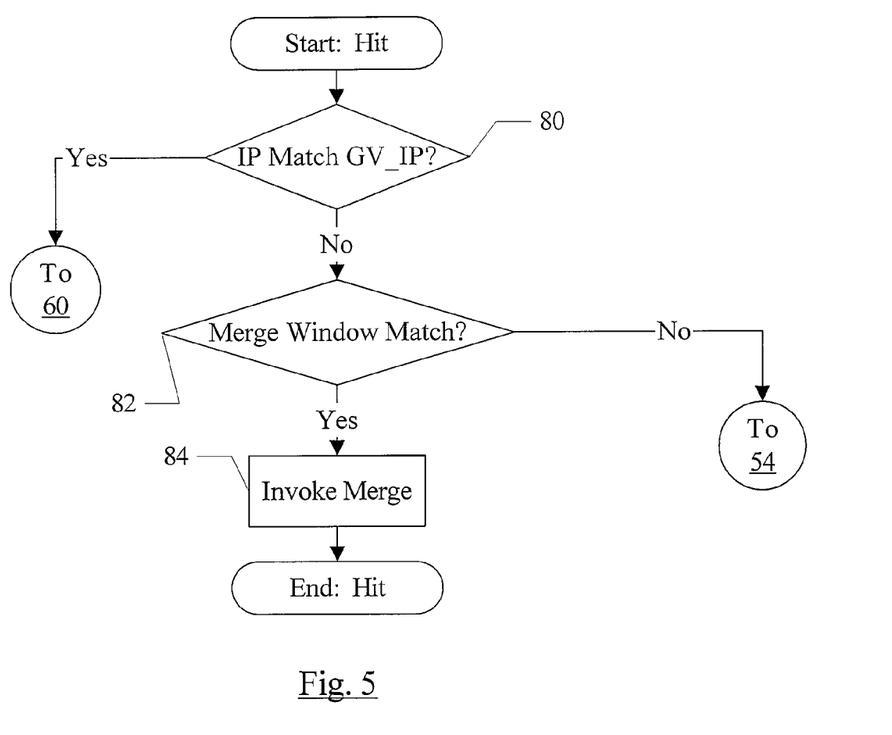
FIG. 5 is a flowchart illustrating operation of another embodiment of the VMM in response to a VMExit.

As mentioned above, some embodiments may merge routines for multiple instructions which are within the same merge window. The merge window may begin at a given intercepted instruction in the guest, and may extend an implementation-dependent length from that instruction. FIG. 5 is a flowchart illustrating one embodiment of additional details for the hit decision block 52, for one embodiment implementing the merge functionality. While blocks are shown in FIG. 5 is a particular order for ease of understanding, other orders may be used. The VMM 18 (and/or the minivisor, in some embodiments) may include instructions which, when executed, implement the operation shown in FIG. 5.

If the IP of the intercepted instruction matches the GV_IP (and other instruction data matches) (decision block 80, "yes" leg), the intercepted instruction is a hit in the intercept tracking table 34 and the flowchart may return to block 60 in FIG. 4. If the IP does not match the GV_IP (decision block 80, "no" leg), and the IP is not within a merge window of an earlier intercepted instruction that has a routine in the translation cache 36 (decision block 82, "no" leg), the flowchart may exit back to decision block 54 in FIG. 4. If the IP is within a merge window of the earlier intercepted instruction that has a routine in the translation cache 36 (decision block 82, "yes" leg), the VMM 18 may invoke the merge (see FIG. 7 for an example) to merge a routine for the intercepted instruction with the earlier intercepted instruction (block 84). It is noted that, in other embodiments, the check for being within the merge window may be performed first, to merge an intercepted instruction's routine with an earlier intercepted instruction even if the intercepted instruction also hits in the intercept tracking table.

Figure 6:
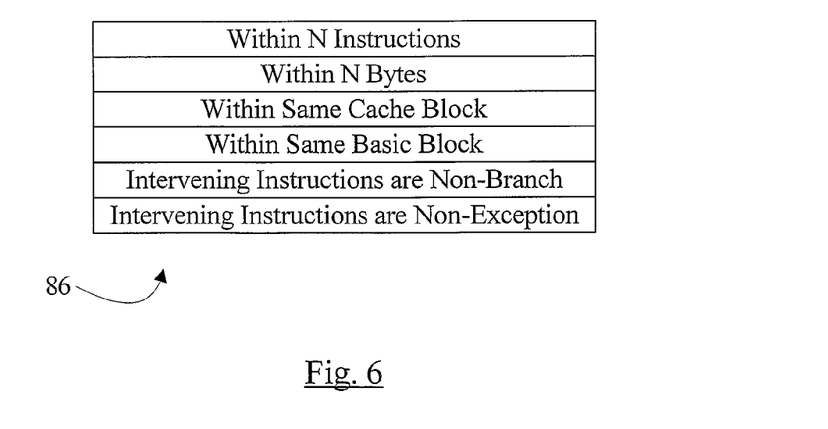
FIG. 6 is a table illustrating various factors in determining a merge window, for won embodiment.

FIG. 6 is a table 86 that indicates various conditions that may be used to limit the length of a merge window. Various embodiments may implement any combination of one or more of the factors shown in table 86, and or may include other factors in combination with zero or more factors shown in FIG. 6.

One factor that may be used is the number of instructions and/or number of instruction bytes, as measured from the earlier intercepted instruction. For example, up to N instructions and/or M instruction bytes may define a merge window. A merge window may be limited to the end of a cache block (of caches in the processor, not the translation cache 36) and/or the end of a basic block. A basic block may be all the instructions up to the next branch instruction.

To simplify the processing of the merged code, various embodiments may require that intervening instructions between the earlier intercepted instruction and the current intercepted instruction be non-conditional-branch instructions and/or non-exception causing instructions. The intervening instructions are read, processed by the translator to ensure that they are valid to run (e.g. determine if any address patching might be needed, etc.) and included in the merged routine in the translation cache 36. If a conditional branch instruction is included, the branch may evaluate the other direction (from its current execution) in a subsequent execution (e.g. taken instead of not taken, or vice versa). Similarly, an exception-causing instruction may cause an exception in a subsequent execution even though it did not cause an exception in the current execution. Alternatively, one or both of the conditional branches and exception-causing instructions may be included an the VMM 18 may be designed to handle the complications.

Figure 7:
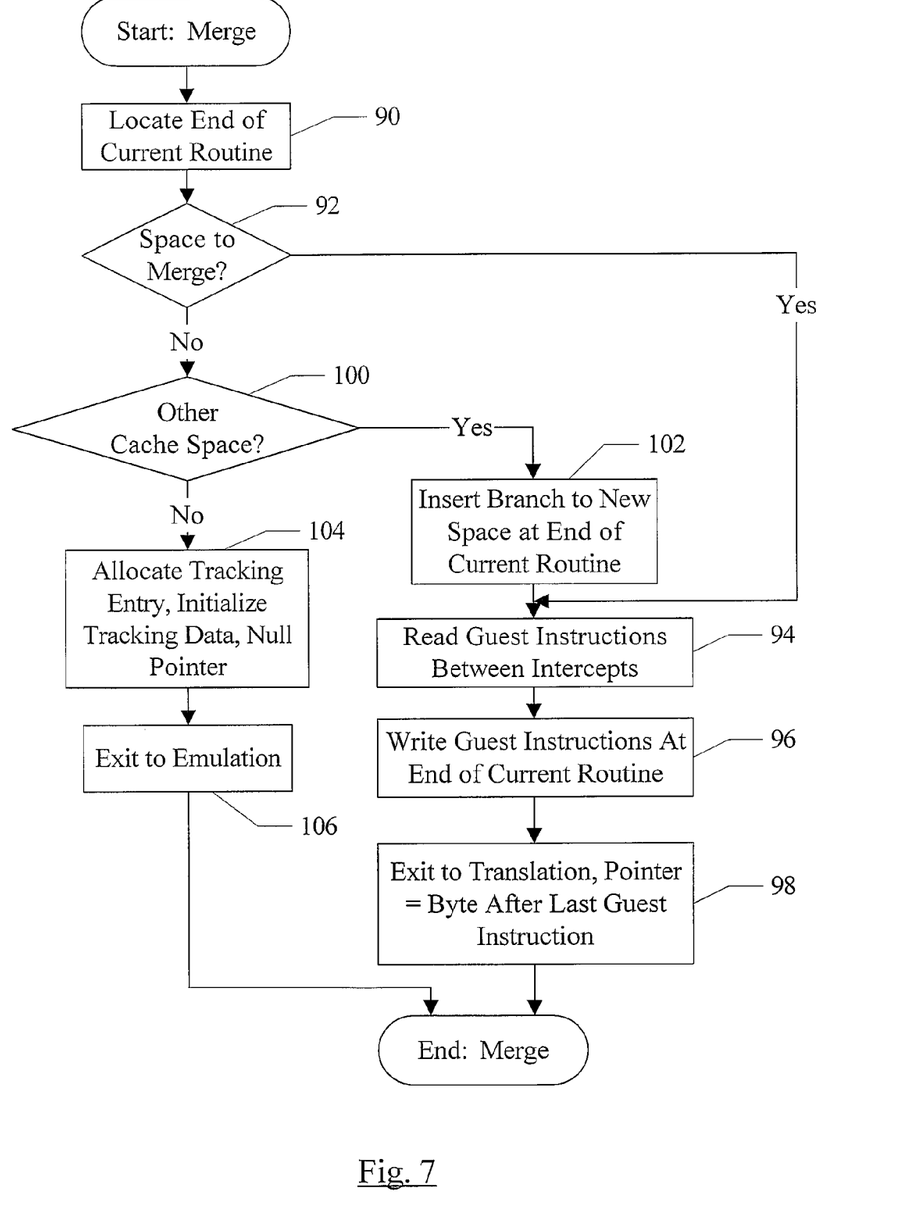
FIG. 7 is a flowchart illustrating operation of an embodiment of the VMM that performs a merge.

Turning now to FIG. 7, a flowchart is shown illustrating one embodiment of the merge operation (e.g. block 84 in FIG. 5). While blocks are shown in FIG. 7 is a particular order for ease of understanding, other orders may be used. The VMM 18 (and/or the minivisor, in some embodiments) may include instructions which, when executed, implement the operation shown in FIG. 7.

The VMM 18 may locate the end of the current routine (for the earlier intercepted instruction) (block 90). The end of the routine may be identified, e.g., by a branch back to the scheduler 32. The VMM 18 may examine the available space contiguous to the end of the current routine to determine if there is sufficient space to merge the routine for the merging intercepted instruction and any intervening instructions. If there is space (decision block 92, "yes" leg), the VMM 18 may read the intervening guest instructions (between the two intercepted instructions) from the guest, if any (block 94) and write the guest instructions to the end of the current routine (block 96). The intervening guest instructions may not be intercepted instructions, and thus may simply be executed in the routine from the translation cache 36 in the same way they are executed in the guest. The merge operation may then exit to the translation code, providing the pointer to the translation code that identifies the byte after the last intervening instruction in the translation cache 36. In this way, the instructions forming the translation of the intercepted instruction are added to the end of the routine for the earlier intercepted instruction. The translation code may also update the VMCB 22 of the guest for any state that was modified by the intervening instructions and the second intercepted instruction, and may update the VMCB's IP to point to the next instruction in program order after the second intercepted instruction.

If there is not sufficient space at the end of the current routine (decision block 92, "no" leg), the VMM 18 may attempt to locate sufficient space elsewhere in the translation cache (decision block 100). If there is sufficient space elsewhere (decision block 100, "yes" leg), the VMM 18 may insert a branch at the end of the current routine to the newly allocated space (block 102). The VMM 18 may insert the intervening guest instructions (blocks 94 and 96) and exit to the translation code (block 98). If there is not sufficient space available elsewhere (decision block 100, "no" leg), the intercepted instruction may be allocated an intercept tracking table entry (block 104, similar to the discussion of block 58 in FIG. 4) and the intercepted instruction may be analyzed and emulated (block 106).

Figure 8:
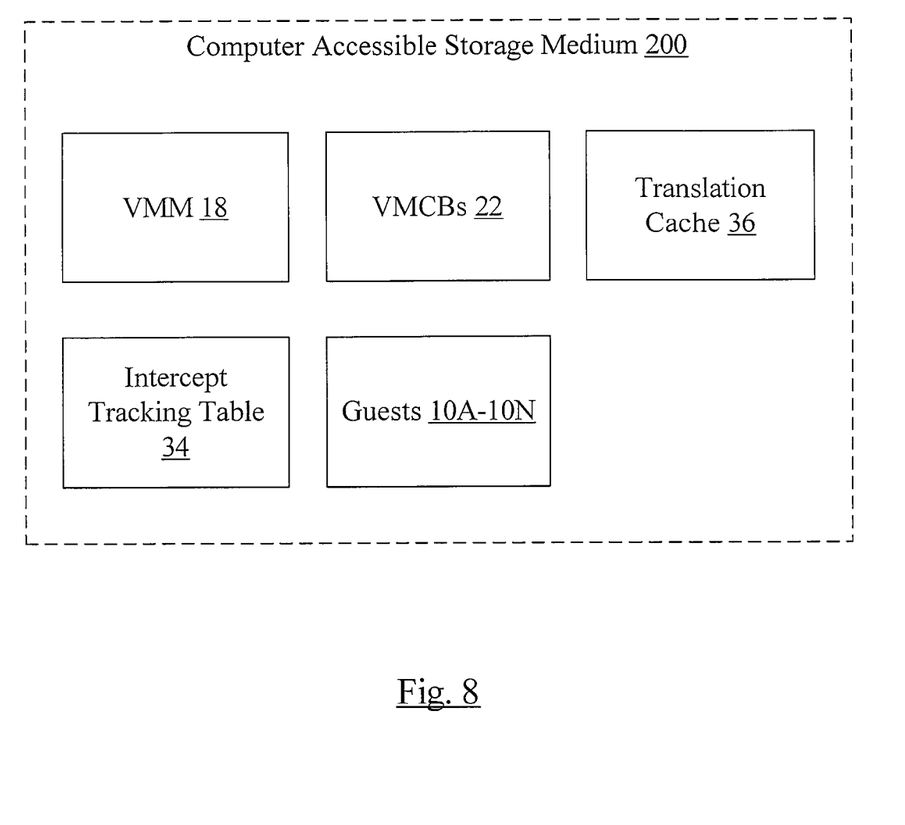
FIG. 8 is a block diagram of one embodiment of a computer accessible medium.

Turning now to FIG. 8, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. The computer accessible storage medium 200 may also include storage media accessible via transmission media such as a network and/or a wireless link. The computer accessible storage medium 200 in FIG. 8 may store one or more of the VMM 18, one or more VMCBs 22, the translation cache 36, the intercept tracking table 34, and/or guests 10A-10N. The VMM 18 may comprise instructions which implement the operations described for the VMM 18 herein. Generally, the computer accessible medium 200 may store any set of instructions which, when executed, implement a portion or all of the operations shown in FIGS. 4, 5, and/or 7. The computer accessible storage medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
    intercepting a first instruction in a guest that is controlled by a virtual machine monitor (VMM), wherein the intercepting causes a processor executing the guest to exit execution of the guest and to begin executing code corresponding to the VMM;
    in response to the intercepting of the first instruction, updating first tracking data corresponding to the first instruction in an intercept tracking table responsive to executing the code corresponding to the VMM;
    determining, from the first tracking data, that a translation of the first instruction into a first routine is to be performed responsive to executing the code corresponding to the VMM; and
    caching the first routine to be executed in response to a subsequent intercept of the first instruction, wherein the first routine is formed from instructions defined in a same instruction set architecture as the first instruction.

2. The method as recited in claim 1 further comprising:
    in response to an intercept of a second instruction in the guest, updating second tracking data corresponding to the second instruction in the intercept tracking table;
    determining, from the second tracking data, that the second instruction is to be emulated; and
    emulating the second instruction.

3. The method as recited in claim 1 further comprising:
    in response to the subsequent intercept of the first instruction, detecting the cached first routine; and
    executing the first routine in the VMM.

4. The method as recited in claim 3 wherein the detecting the cached first routine is responsive to a virtual instruction pointer from the guest that corresponds to the first instruction.

5. The method as recited in claim 4 wherein the detecting is still further responsive to additional data related to the first instruction and stored in the intercept tracking table.

6. The method as recited in claim 5 wherein the additional data comprises a physical address translated from the virtual instruction pointer.

7. The method as recited in claim 5 wherein the additional data comprises data describing the first instruction.

8. The method as recited in claim 7 wherein the data describing the first instruction comprises at least a subset of instruction bytes that form the first instruction.

9. The method as recited in claim 1 wherein the first tracking data comprises a count of a number of intercepts of the first instruction, and wherein the determining comprises determining that the count exceeds a threshold number of intercepts.

10. The method as recited in claim 1 further comprising:
    in response to a second intercept of a second instruction in the guest, detecting that the second instruction is within a merge window of the first instruction in the guest; and
    adding additional instructions to the first routine to handle the second instruction as well as the first instruction, whereby the subsequent intercept and execution of the first routine handles both the first instruction and the second instruction in response to the subsequent intercept.

11. The method as recited in claim 10 further comprising:
    detecting one or more intervening instructions in the guest between the first instruction and the second instruction;
    reading the one or more intervening instructions from the guest;
    validating the one or more intervening instructions for execution in the first routine; and
    writing the one or more intervening instructions into the first routine.

12. The method as recited in claim 10 further comprising:
    detecting insufficient space to add the additional instructions at an end of the first routine;
    allocating additional space disjoint from the first routine;
    storing the additional instructions in the additional space; and adding a branch at an end of the first routine to the additional space.

13. A non-transitory computer accessible storage medium storing a plurality of instructions comprising code corresponding to a virtual machine manager (VMM), wherein the code, when executed:
  updates first tracking data corresponding to a first instruction in an intercept tracking table in response to an intercept of the first instruction in a guest that is controlled by the VMM, wherein the intercept of the first instruction causes a processor executing the guest to exit the guest and to begin executing the code, wherein executing the code corresponding to the VMM causes the update to be performed;
  determines, from the first tracking data, that a translation of the first instruction into a first routine is to be performed, wherein executing the code corresponding to the VMM causes the determination to be performed; and
  caches the first routine to be executed in response to a subsequent intercept of the first instruction, wherein the first routine is formed from instructions defined in a same instruction set architecture as the first instruction.

14. The computer accessible storage medium as recited in claim 13 wherein the plurality of instructions, when executed in response to an intercept of a second instruction in the guest:
  update second tracking data corresponding to the second instruction in the intercept tracking table;
  determine, from the second tracking data, that the second instruction is to be emulated; and
  emulate the second instruction.

15. The computer accessible storage medium as recited in claim 13 wherein the plurality of instructions, when executed in response to the subsequent intercept of the first instruction:
  detect the cached first routine; and
  execute the first routine.

16. The computer accessible storage medium as recited in claim 13 wherein the first tracking data comprises a count of a number of intercepts of the first instruction, and wherein the plurality of instructions which, when executed determine, from the first tracking data, that a translation of the first instruction into a first routine is to be performed include instructions which, when executed, determine that the count exceeds a threshold number of intercepts.

17. The computer accessible storage medium as recited in claim 13 wherein the plurality of instructions, when executed in response to a second intercept of a second instruction in the guest:
  detect that the second instruction is within a merge window of the first instruction in the guest; and
  add additional instructions to the first routine to handle the second instruction as well as the first instruction, whereby the subsequent intercept and execution of the first routine handles both the first instruction and the second instruction in response to the subsequent intercept.

18. The computer accessible storage medium as recited in claim 17 wherein the plurality of instructions, when executed:
  detect one or more intervening instructions in the guest between the first instruction and the second instruction;
  read the one or more intervening instructions from the guest;
  validate the one or more intervening instructions for execution in the first routine; and
  write the one or more intervening instructions into the first routine.

19. A method comprising:
  in response to an intercept of a first instruction in a guest that is controlled by a virtual machine monitor (VMM), detecting that the first instruction is within a merge window of a second instruction in the guest, wherein the VMM has cached a first routine corresponding to the second instruction to be executed in response to an intercept of the second instruction;
  translating the first instruction into a plurality of additional instructions;
  adding the plurality of additional instructions to the first routine;
  detecting one or more intervening instructions in the guest between the first instruction and the second instruction;
  reading the one or more intervening instructions from the guest;
  validating the one or more intervening instructions for execution in the first routine; and
  writing the one or more intervening instructions into the first routine.

* * * * *